(12) United States Patent
Cox

(10) Patent No.: US 11,560,224 B2
(45) Date of Patent: Jan. 24, 2023

(54) ECCENTRICALLY ADJUSTED ROTATING SCISSOR PITCH CONTROL LINK

(71) Applicant: LOCKHEED MARTIN CORPORATION, Bethesda, MD (US)

(72) Inventor: John C. Cox, Jupiter, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 464 days.

(21) Appl. No.: 16/738,623

(22) Filed: Jan. 9, 2020

(65) Prior Publication Data

US 2021/0214077 A1 Jul. 15, 2021

(51) Int. Cl.
*B64C 27/605* (2006.01)
*B64C 27/80* (2006.01)
*B64C 27/10* (2006.01)

(52) U.S. Cl.
CPC ............ *B64C 27/605* (2013.01); *B64C 27/10* (2013.01); *B64C 27/80* (2013.01)

(58) Field of Classification Search
CPC ....... B64C 27/605; B64C 27/10; B64C 27/80; B64C 27/32; B64C 27/615; B64C 27/68; Y02T 50/34
See application file for complete search history.

(56) References Cited

U.S. PATENT DOCUMENTS

| 6,824,096 | B2* | 11/2004 | Zoppitelli | B64C 27/41 244/17.27 |
|---|---|---|---|---|
| 7,648,338 | B1* | 1/2010 | Welsh | B64C 27/10 416/61 |
| 7,841,829 | B2* | 11/2010 | Schmaling | B64C 27/32 416/1 |
| 7,988,089 | B2* | 8/2011 | Wittmer | B64C 27/605 244/228 |
| 8,142,158 | B2* | 3/2012 | Schmaling | B64C 27/605 416/159 |
| 8,858,179 | B2* | 10/2014 | Cowles | B64C 27/10 416/147 |
| 9,315,265 | B2* | 4/2016 | Halcom | B64C 27/06 |
| 10,279,898 | B2 | 5/2019 | Green et al. | |
| 2008/0253891 | A1* | 10/2008 | Cabrera | B64C 27/605 416/134 A |
| 2014/0271203 | A1* | 9/2014 | Foskey | F01D 7/00 29/889 |
| 2014/0271204 | A1* | 9/2014 | Shundo | B64C 27/605 416/147 |

(Continued)

FOREIGN PATENT DOCUMENTS

| WO | WO-2015017101 A1 * | 2/2015 | ............ B64C 27/06 |
| WO | WO-2016109004 A2 * | 7/2016 | ........... B64C 27/605 |

*Primary Examiner* — Assres H Woldemaryam
(74) *Attorney, Agent, or Firm* — Foley & Lardner LLP

(57) ABSTRACT

An adjustable control link for transferring rotor shaft rotation to a rotating swashplate, the adjustable control link includes an elongate element rotatable with the rotor shaft, the elongate element having a first end. A structure has an opening and a second end. At least one cam component is disposed within the opening and is rotatable relative to the structure about a central axis of the opening. A pin is configured to couple the elongate element to the at least one cam component. The pin is eccentrically rotatable about the central axis to move the first end of the elongate element relative to the second end of the structure.

19 Claims, 12 Drawing Sheets

(56) References Cited

U.S. PATENT DOCUMENTS

| | | | | |
|---|---|---|---|---|
| 2016/0090178 A1* | 3/2016 | Paynton | ............... | B64C 27/605 |
| | | | | 416/112 |
| 2018/0297696 A1* | 10/2018 | Laitenberger | ......... | B64C 27/605 |
| 2019/0203765 A1* | 7/2019 | Baskin | ................. | F16C 25/04 |
| 2021/0323661 A1* | 10/2021 | Ge | ....................... | B64C 27/80 |

* cited by examiner

ECCENTRICALLY ADJUSTED ROTATING SCISSOR PITCH CONTROL LINK

BACKGROUND

The subject matter disclosed herein relates to a rotor control system for a rotary wing aircraft and, more particularly, to a rotor control system for a rotary wing aircraft that includes an adjustable scissor control link.

Control of a rotary-wing aircraft, such as a vertical takeoff and landing (VTOL) aircraft or helicopter, is affected through cyclic and collective pitch control. Blade pitch control of a rotary-wing aircraft main rotor system is typically achieved through a swashplate assembly which transfers the motion of non-rotating control members within a stationary field to the rotating members within a rotational field. The swashplate assembly generally includes two rings connected by a series of bearings with one swashplate ring connected to the airframe/gearbox (stationary field), and the other swashplate ring connected to a rotor hub (rotational field). Apart from rotary motion, the rotationally stationary swashplate ring and the rotational swashplate ring otherwise move as a unitary component.

BRIEF DESCRIPTION

According to an embodiment, an adjustable control link for transferring rotor shaft rotation to a rotating swashplate, the adjustable control link includes an elongate element rotatable with the rotor shaft, the elongate element having a first end. A structure has an opening and a second end. At least one cam component is disposed within the opening and is rotatable relative to the structure about a central axis of the opening. A pin is configured to couple the elongate element to the at least one cam component. The pin is eccentrically rotatable about the central axis to move the first end of the elongate element relative to the second end of the structure.

In addition to one or more of the features described above, or as an alternative, in further embodiments the pin is mounted to the at least one cam component at a position offset from the central axis.

In addition to one or more of the features described above, or as an alternative, in further embodiments the pin is radially offset from the central axis.

In addition to one or more of the features described above, or as an alternative, in further embodiments the pin is laterally offset from the central axis.

In addition to one or more of the features described above, or as an alternative, in further embodiments the structure further comprises: a first sidewall; a second sidewall; and a body extending between the first sidewall and the second sidewall; wherein the opening is disposed in the first and second sidewalls and the pin extends between the first and second sidewalls so as to dispose the elongate element there between.

In addition to one or more of the features described above, or as an alternative, in further embodiments the first sidewall and the second sidewall converge at the second end of the structure.

In addition to one or more of the features described above, or as an alternative, in further embodiments a mating element is defined at an end of at least one of the first sidewall and the second sidewall, the at least one cam component being mounted to the mating element.

In addition to one or more of the features described above, or as an alternative, in further embodiments the at least one cam component includes a flange and at least one primary engagement feature is formed at a periphery of the flange.

In addition to one or more of the features described above, or as an alternative, in further embodiments comprising a locking mechanism selectively mounted to the at least one cam component to restrict rotation of the at least one cam component about the central axis.

In addition to one or more of the features described above, or as an alternative, in further embodiments the structure includes at least one marking and the at least one cam component includes an indicator movable into alignment with the at least one marking to indicate an angle of the elongate member relative to the structure.

According to another embodiment, a rotor control system for use with a rotor and an airframe includes a rotor shaft rotatable about a rotor axis, a rotating swashplate, at least one primary pitch control link associated with the rotor shaft, and at least one secondary pitch control link coupled to rotating swashplate to control a position of the at least one primary pitch control link. The at least one secondary pitch control link includes a scissor control link adjustable to control a length of the secondary pitch control link.

In addition to one or more of the features described above, or as an alternative, in further embodiments the scissor control link transmits rotation of the rotor shaft to the rotating swashplate.

In addition to one or more of the features described above, or as an alternative, in further embodiments the scissor control link further comprises: at least one elongate element coupled to the at least one primary pitch control link, the elongate element having a first end, a structure having an opening and a second end, at least one cam component disposed within the opening and rotatable relative to the structure about a central axis of the opening, and a pin configured to couple the elongate element to the at least one cam component. The pin is eccentrically rotatable about the central axis to move the first end of the elongate element relative to the second end of the structure.

In addition to one or more of the features described above, or as an alternative, in further embodiments the scissor control link is adjustable to control an angle between the at least one secondary pitch control link and the at least one elongate element.

In addition to one or more of the features described above, or as an alternative, in further embodiments the pin is mounted to the at least one cam component at a position offset from the central axis.

In addition to one or more of the features described above, or as an alternative, in further embodiments the structure further comprises: a first sidewall, a second sidewall, and a body extending between the first sidewall and the second sidewall.

In addition to one or more of the features described above, or as an alternative, in further embodiments the first sidewall and the second sidewall converge at a first end of the structure.

In addition to one or more of the features described above, or as an alternative, in further embodiments a mating element is defined at an end of at least one of the first sidewall and the second sidewall, the at least one cam component being mounted to the mating element.

In addition to one or more of the features described above, or as an alternative, in further embodiments an aircraft includes the rotor, the airframe and the rotor control system.

In addition to one or more of the features described above, or as an alternative, in further embodiments comprising a second rotor coaxial with the rotor, wherein the rotor and the second rotor rotate in opposite directions about the rotor axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
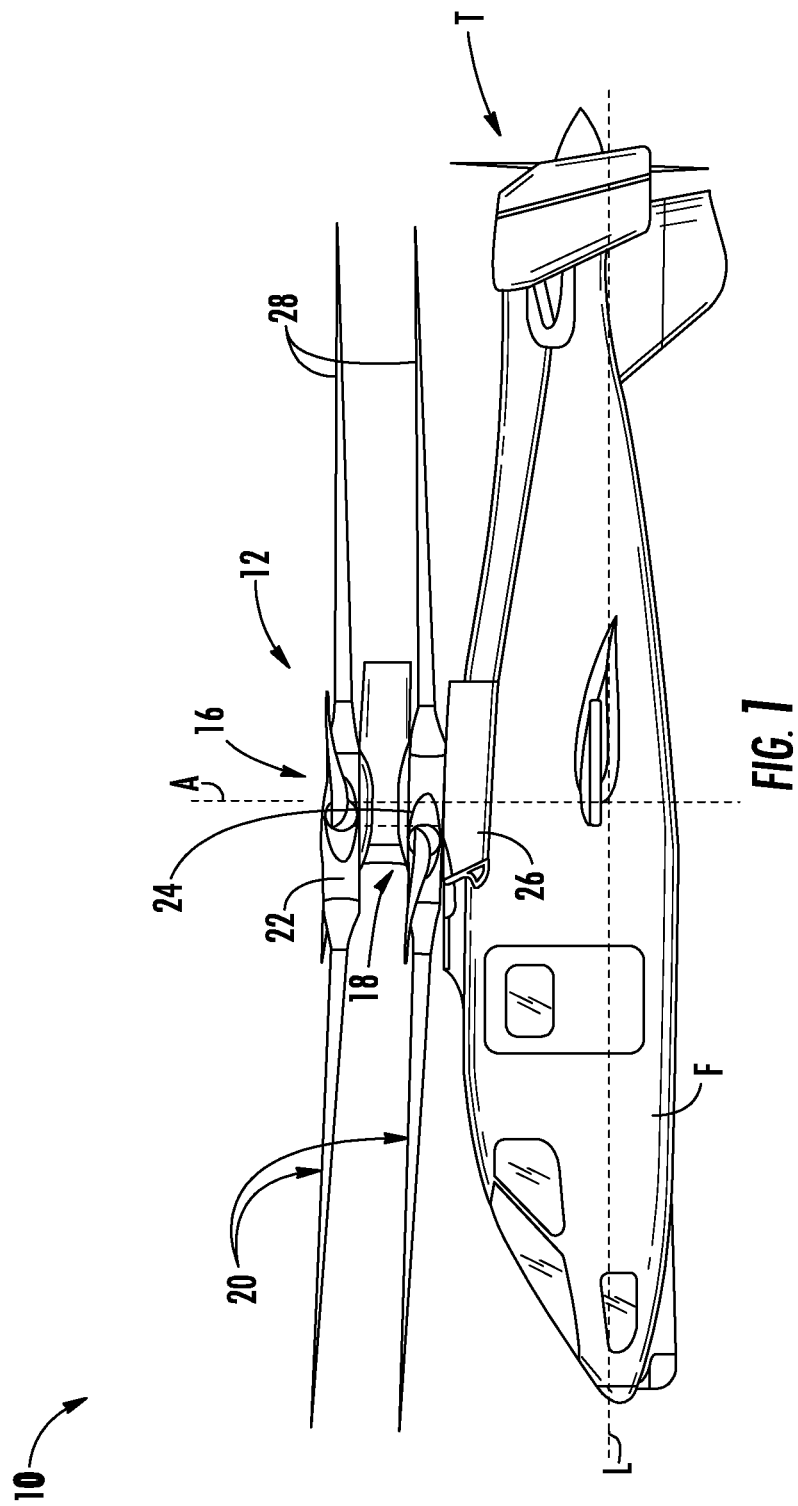
FIG. 1 is a perspective side view of an exemplary rotary-wing aircraft in accordance with embodiments.

Referring to FIG. 1, and example of a vertical takeoff and landing (VTOL) rotary-wing aircraft 10 is illustrated. As shown, the aircraft 10 has a dual, counter-rotating, coaxial rotor system 12 which rotates through a counter-rotating main rotor shaft 14U, 14L (FIG. 2) about an axis of rotation A. The aircraft includes a fixed frame F, which supports the dual counter-rotating coaxial rotor system, as well as an optional translational thrust system T, which provides translational thrust during high speed forward flight in a direction that is generally parallel to an aircraft longitudinal axis L. Although an aircraft having a particular counter-rotating, coaxial rotor system configuration is illustrated and described in the disclosed embodiment, it should be understood that other types of rotor systems and aircrafts, such as single rotor helicopters, tilt-wing and tilt-rotor aircraft for example, are also within the scope of the disclosure.

Figure 2:
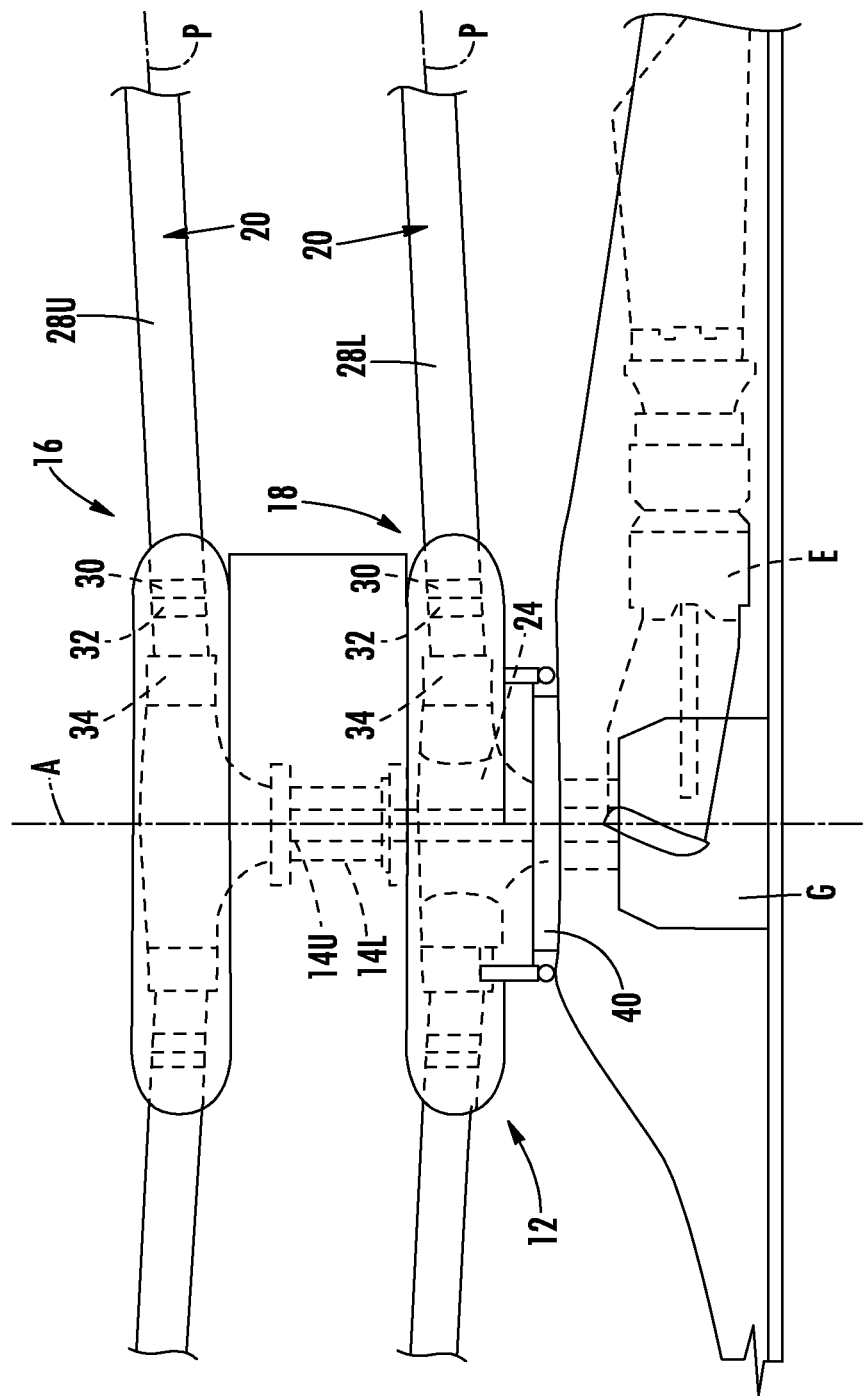
FIG. 2 is an expanded partial phantom view of a dual counter-rotating coaxial rotor system of the aircraft of FIG. 1.

With reference now to FIG. 2, a main gearbox G (FIG. 2) is driven by one or more engines or motors (illustrated schematically at E) and is configured to drive the rotor system 12. The translational thrust system T may also be driven by the same main gearbox G which drives the rotor system 12, or alternatively, by a different gearbox. As shown, the main gearbox G may be interposed between the engines E, the rotor system 12 and the translational thrust system T although the precise location is not restricted thereto.

The dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter-rotates within the lower rotor shaft 14L which rotates the lower hub assembly 24.

The plurality of main rotor blade assemblies 20 project substantially radially outward from the hub assemblies 22, 24. Any number of main rotor blade assemblies 20 may be used with the rotor system 12. Each rotor blade assembly of the rotor system generally includes a rotor blade 28, a rotor blade spindle 30, and a rotor blade bearing 32 which support the rotor blade spindle 20 within a bearing housing 34 to permit the rotor blade 28 to rotate about a pitching axis P. It should be understood that various blade attachments may also be utilized with the present disclosure.

Figure 3:
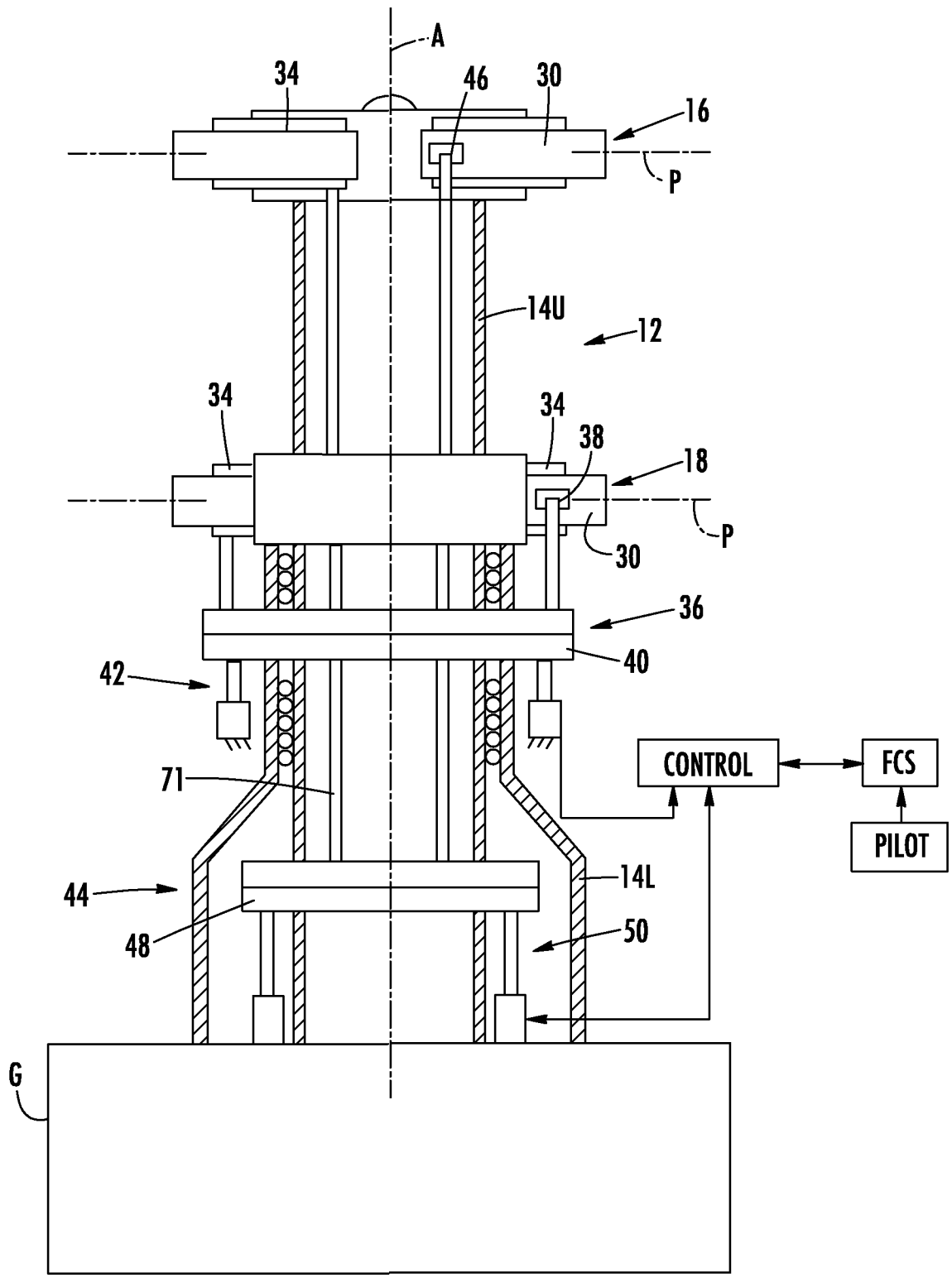
FIG. 3 is a longitudinal sectional view through a dual counter-rotating coaxial rotor system along a rotor system axis of rotation.

Referring now to FIG. 3, the rotor system 12 includes a lower rotor control system 36 with a rotor blade pitch control horn 38 mounted for rotation with the rotor blade spindle 30 of each lower rotor blade 28. Each rotor blade pitch control horn 38 is linked to an actuation mechanism 42 through a lower rotor swashplate assembly 40 to impart the desired pitch control thereto.

An upper rotor control system 44 includes a rotor blade pitch control horn 46 mounted for rotation with the rotor blade spindle 30 of each upper rotor blade 28. Each rotor blade pitch control horn 46 is linked to an actuation mechanism 50 through an upper rotor swashplate assembly 48 to impart the desired pitch control thereto.

The lower rotor and upper rotor swashplate assemblies 40, 48 may be translated and/or tilted by the actuation mechanisms 42, 50, such that each rotor control system 36, 44 may be independently controlled in both cyclic and collective pitch. Generally, translational movement of the lower rotor and upper rotor swashplate assemblies 40, 48 along the rotor axis A will cause the respective rotor blades 28 to vary in pitch collectively, while tilting of the lower rotor and the upper rotor swashplate assemblies 40, 48 with respect to the rotor axis A will cause the respective rotor blades 28 to vary in pitch cyclically to ultimately tilt the rotor thrust vector. In an embodiment, the rotor control systems 36, 44 communicate with a flight control system FCS that receives pilot inputs from controls such as a collective stick, cyclic stick, foot pedals and the like and/or via fly-by-wire technologies.

It should be understood that one or more pitch control links (to be described in more detail below), lower rotor and upper rotor swashplate assemblies 40, 48, and actuation mechanisms 42, 50 for the respective upper rotor system 16 and lower rotor system 18 may be located internally or externally to the respective main rotor shaft 14U, 14L and that various pitch control links and actuation mechanisms at various locations for cyclic and collective pitch control of the rotor system 12 may be utilized as discussed herein.

Figure 4:
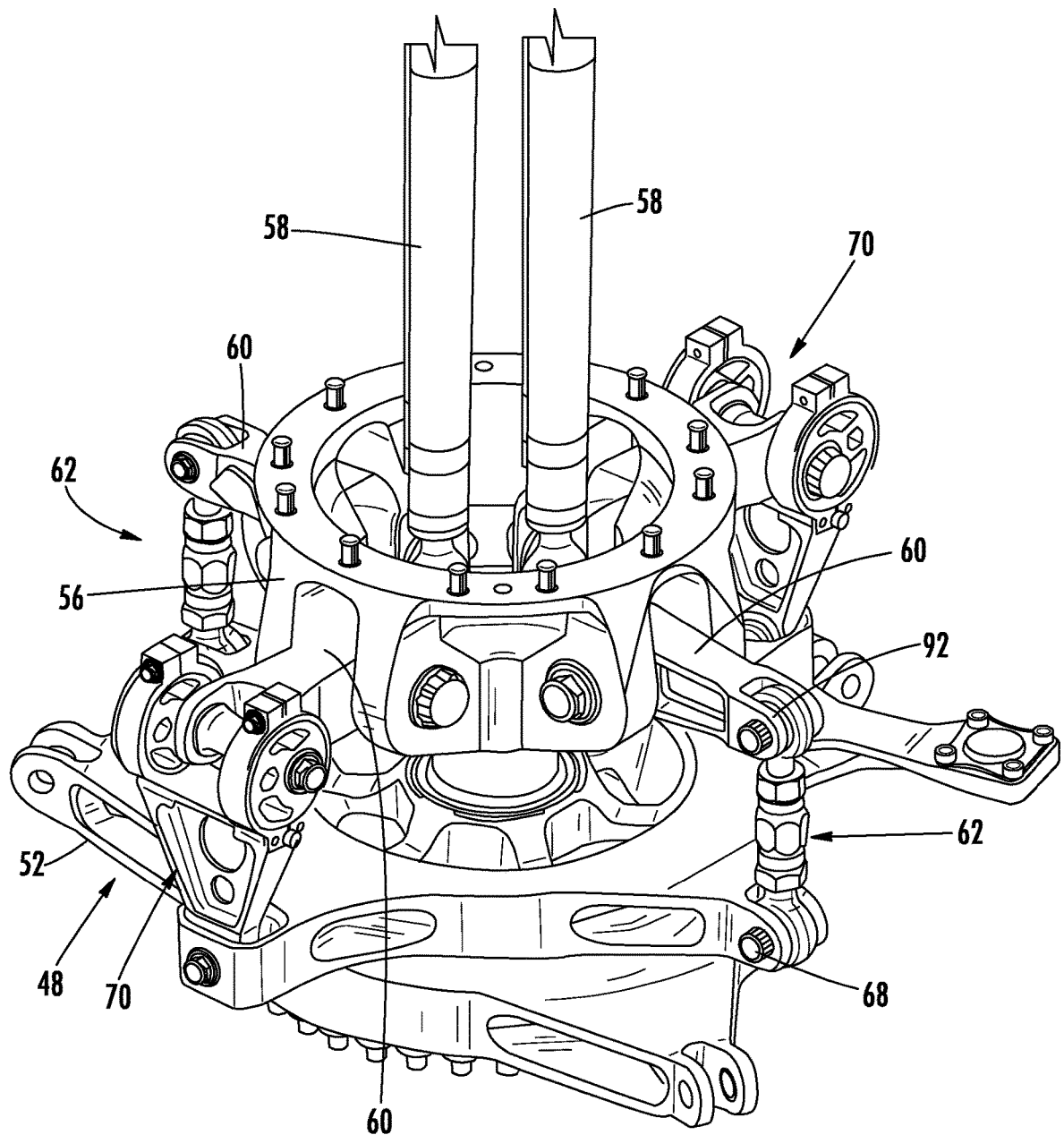
FIG. 4 is a perspective view of a rotor shaft and rotor control system in accordance with an embodiment.

Turning now to FIG. 4, the upper rotor assembly 48 includes a stationary swashplate 52 that is ultimately connected to the fixed airframe F of FIG. 1, and a rotating swashplate 54 configured to rotate relative to the stationary swashplate 52. A mixer housing 56 rotates with the upper rotor shaft 14U and is disposed in or proximate to the upper rotor shaft 14U. As shown, the mixer housing is configured to surround a plurality of primary pitch control links 58 associated with the individual blades 28 of the upper rotor system 16. In an embodiment, the mixer housing 56 is attached to the upper rotor shaft 14U such that the mixer housing 56 rotates with the upper shaft 14U. However, embodiments where the mixer housing 56 is not attached to the upper rotor shaft 14U are also within the scope of the disclosure.

As shown in FIG. 4, the primary pitch control links 58 are provided in a group, and each primary pitch control link 58 is associated with a corresponding rotor blade 28. In an embodiment, an elongate element 60, also referred to herein as a walking beam, is coupled to each of the plurality of primary pitch control links 58. Each elongate element 60 is pivotable about an axis relative to the mixer housing 56 to cause a respective primary pitch control link 58 to translate or swing upward or downward.

Although the mixer housing 56 has been described as a feature that surrounds the plurality of primary pitch control links 58, it should be understood that in other embodiments, the mixer housing 56 need not surround the primary pitch control links 58. In such alternative embodiments, the mixer housing 56 may be disposed within a grouping of primary pitch control links 58 or to a side of the plurality of primary pitch control links 58 for example. In addition, although the plurality of primary pitch control links 58 and the elongate elements 60 are illustrated as being provided in groups of four, it should be understood that any suitable number of both primary pitch control links and elongate elements 60, such as less than four, or more than four for example, are also contemplated herein.

Figure 5:
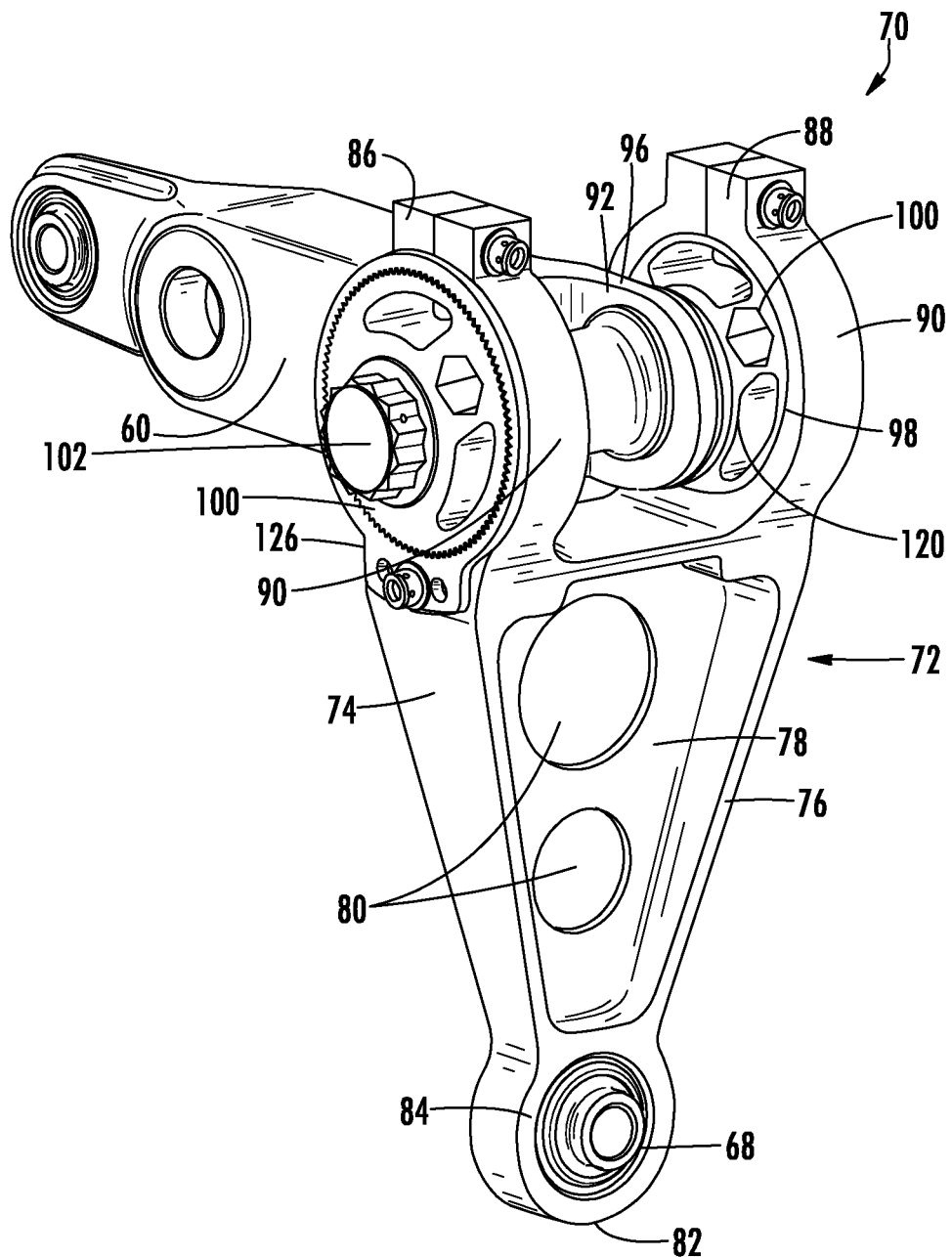
FIG. 5 is a perspective view of an adjustable scissor control link in accordance with an embodiment.

In an embodiment, the rotor control systems 36, 44 additionally include a plurality of secondary pitch control links 62, best shown in FIGS. 4 and 5. Each secondary pitch control link 62 is coupled to a corresponding elongate element 60 and to a bearing element 68 of the rotating swashplate 54. Prior to use, the secondary pitch control links 62 are axially adjusted as described below to provide for blade tracking. Once the axial adjustment is completed, the secondary pitch control links 62 control the position of the primary pitch control links 58 in accordance with a location and orientation of the rotating swashplate 54 via the elongate elements 60.

At least one of the secondary pitch control links 62 is provided as an adjustable scissor control link 70 configured to transmit rotation of the upper rotor shaft 14U to the rotating swashplate 54. In the illustrated, non-limiting embodiment, two adjustable scissor control links 70 are provided for balance and redundancy about the rotor axis A (see FIG. 2). However, it should be understood that a pitch control system having any number of adjustable scissor control links 70 is within the scope of the disclosure. For example, in some embodiments only one of the secondary pitch control links 62 is provided as an adjustable scissor control link 70, or alternatively, all of the secondary pitch control links 62 may be provided as adjustable scissor control links 70. The one or more adjustable scissor control links 70 may be used exclusively to transmit rotation of the upper rotor shaft 14U to the rotating swashplate 54.

In some instances, the rotating swashplate 54 will tend to resist rotation due to bearing friction generated between the rotating swashplate 54 and the stationary swashplate 52. Absent one or more adjustable scissor control links 70, this bearing friction would cause the secondary pitch control links 62 to rotate or tilt relative to the elongate elements 60. As a result, the rotation of the mixer housing 56 would be transmitted to the rotating swashplate 54. Accordingly, including of one or more adjustable scissor control link 70 resists this rotation/tilt and prevents a dragging formation from taking effect.

Figure 6:
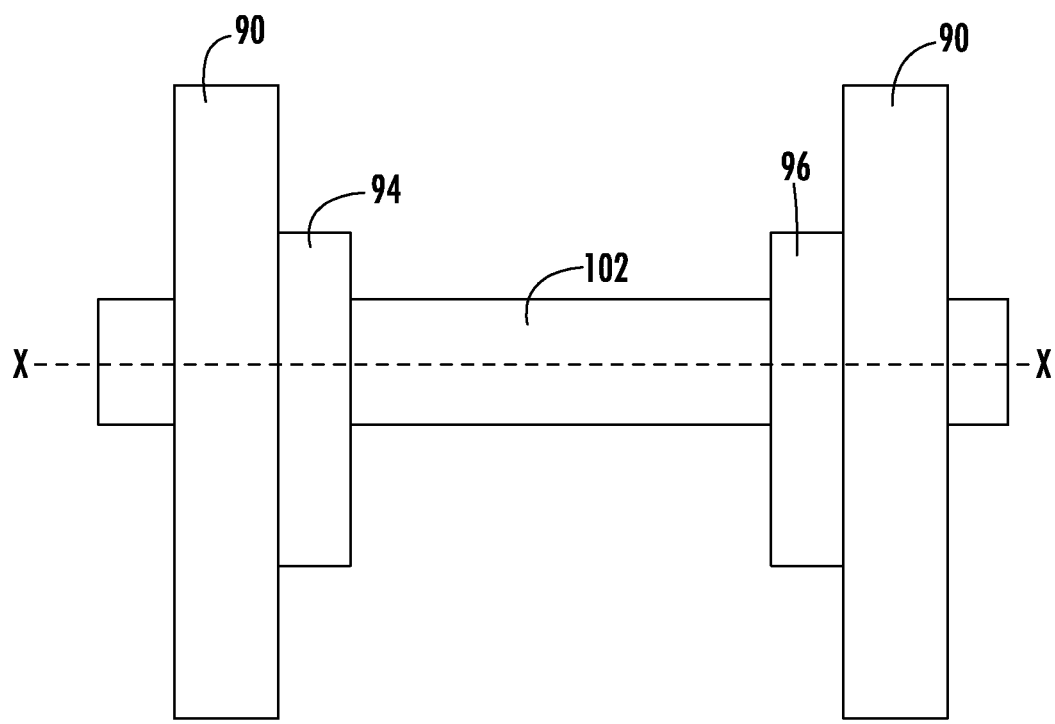
FIG. 6 is a plan view of an interface between the elongate element and the adjustable scissor control link of FIG. 5 in accordance with an embodiment.
Figure 7:
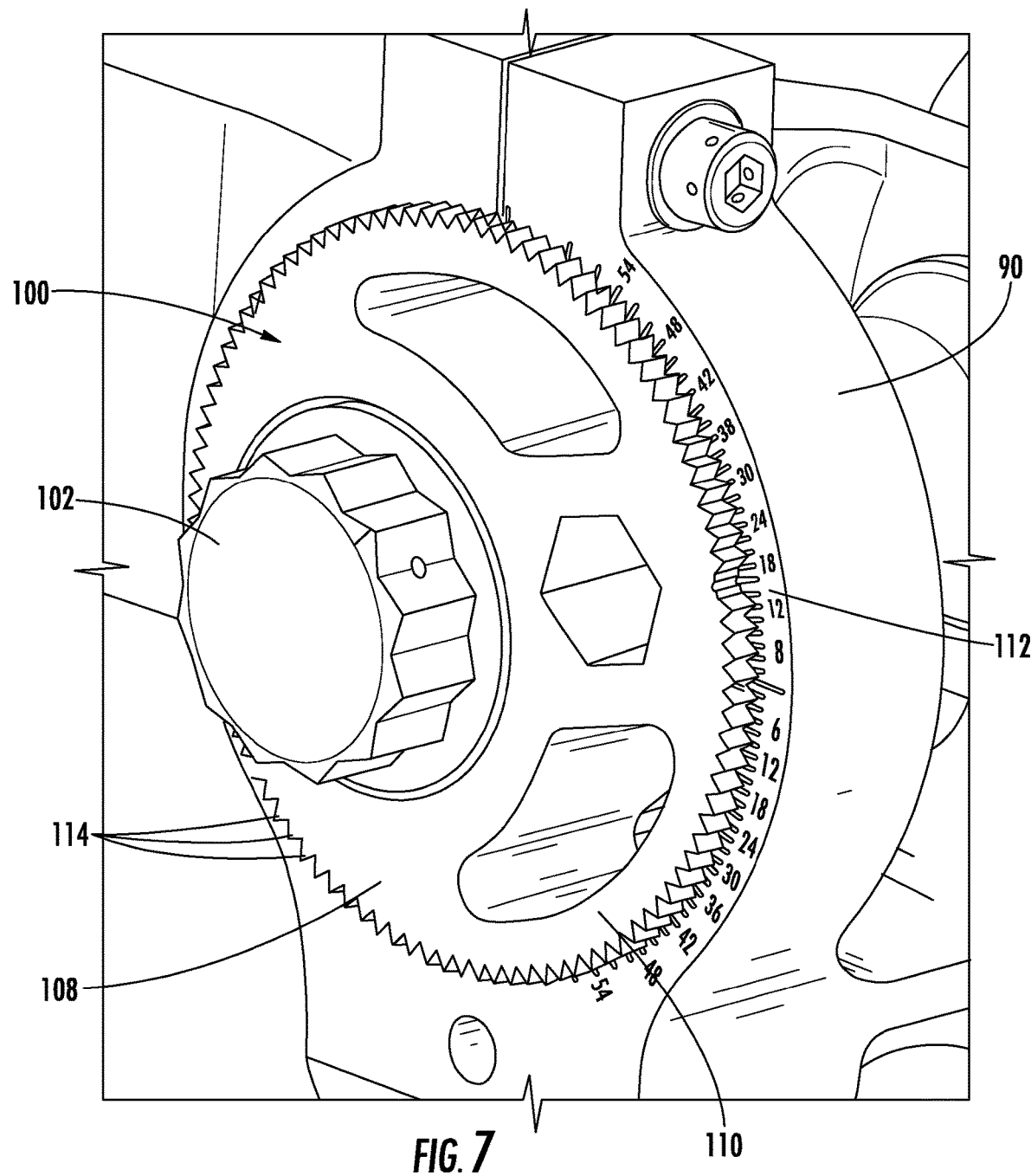
FIG. 7 is a perspective view of a side of the adjustable scissor control link in accordance with an embodiment.
Figure 8:
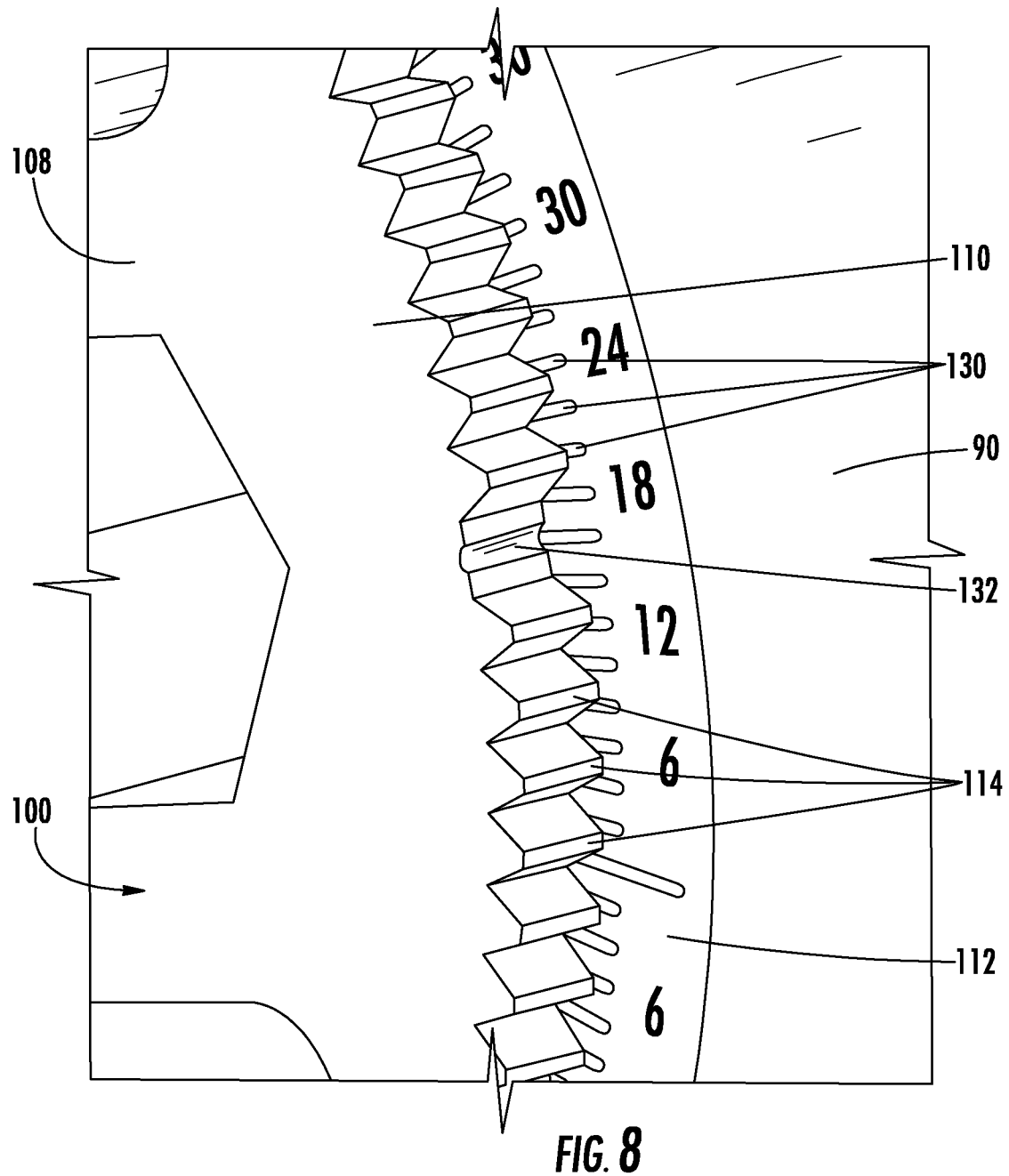
FIG. 8 is a detailed perspective view of FIG. 7 in accordance with an embodiment.

With reference now to FIGS. 5 and 6, an example of an adjustable scissor control link 70 is illustrated in more detail according to an embodiment. As shown, the adjustable scissor control link 70 includes a structure 72 including a first sidewall 74, a second sidewall 76, and a body 78 extending between the first and second sidewalls 74, 76. One or more openings 80 may be formed in the body 78 to decrease the overall weight of the structure 72 without affecting the structural integrity of the structure 72.

In the illustrated, non-limiting embodiment, the first and second sidewalls 74, 76 are connected to one another at a respective first end 82 of the structure 72. As shown, the first and second sidewalls 74, 76 converge toward one another at the first end 82. Further, the first end 82 of the structure 72 includes an opening 84 within which a bearing element 68 of the rotating swashplate 54 is received as previously described. The second end 86, 88 of the first and second sidewalls 74, 76, respectively, generally oppose one another and a mating element 90 of the structure 72 is formed at each end 86, 88. In the illustrated, non-limiting embodiment, the mating elements 90 have a substantially identical configuration. However, it should be understood that embodiments where a configuration of the mating elements 90 varies is also contemplated herein. Further, in an embodiment, each mating elements 90 may form a friction clamp.

In an embodiment, an end 92 of an elongate element 60 is connectable to one or more of the mating elements 90. For example, the mating elements 90 may cooperate to define a space within which the end 92 of a elongate element 60 is receivable. In the illustrated, non-limiting embodiment, the end 92 of the elongate element 60 connectable to the scissor control link 70 includes a clevis having a first arm 94 (see FIG. 6) and a second arm 96. In such embodiments, the first arm 94 may be disposed generally adjacent the mating element 90 defined by the first sidewall 74 and the second arm 96 may be disposed generally adjacent the mating element 90 defined by the second sidewall 76. Although the first arm 94 and second arm 96 are illustrated as being positioned adjacent in inner surface of the mating elements 90, embodiments where one or more of the first arm 94 and the second arm 96 are located adjacent an outer surface of a corresponding mating element 90 are also within the scope of the disclosure.

Figure 12:
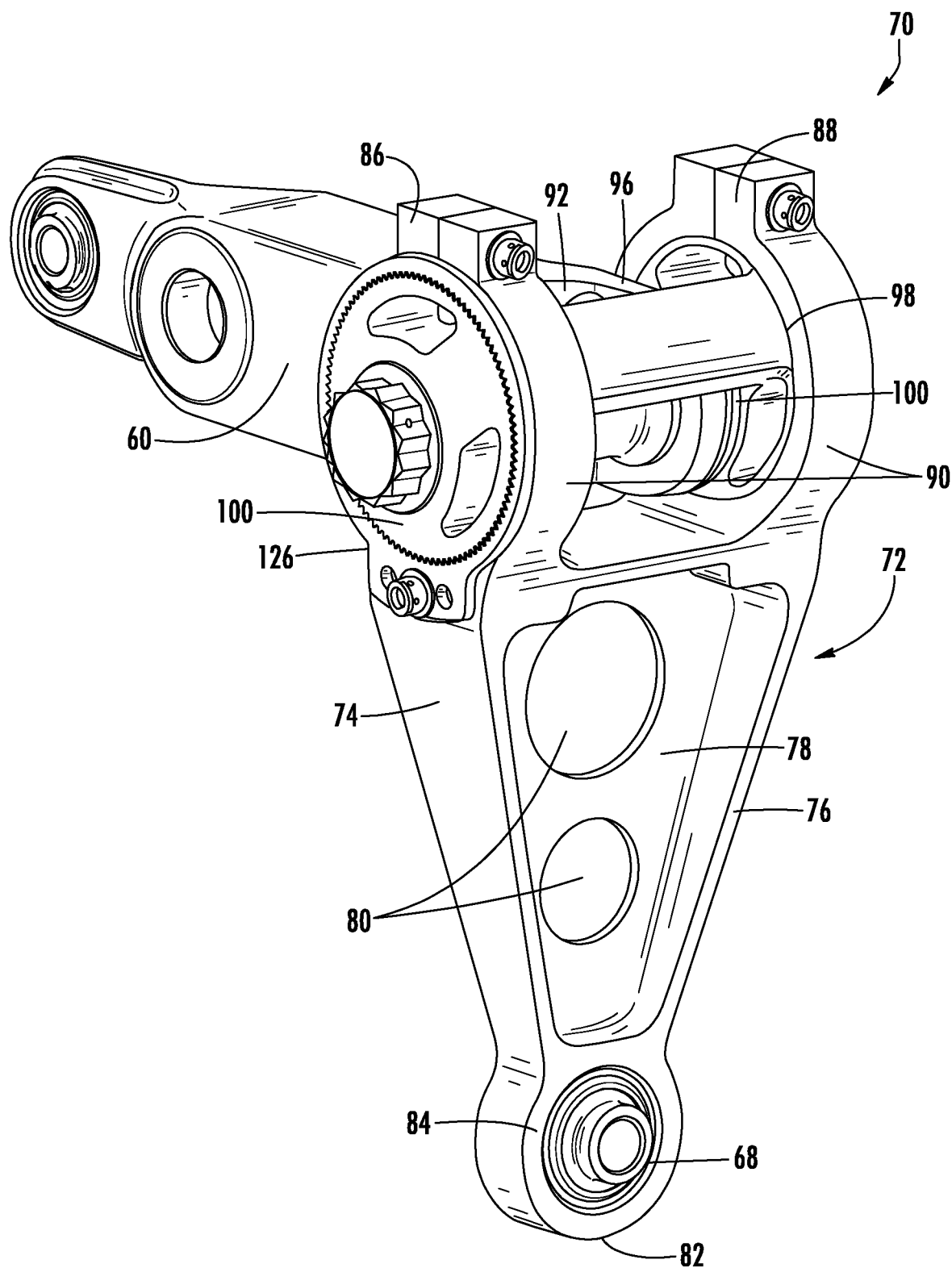
FIG. 12 is a perspective view of an adjustable scissor control link where the cam components are connected according to an embodiment.

A central bore or opening 98 is formed within each of the mating elements 90 and a cam component 100 is rotatably mounted within the central bore 98 of at least one mating element 90. At least one hinge pin 102 is operable to couple the end 92 of the elongate element 60 to the scissor control link 70. In the illustrated, non-limiting embodiment, the hinge pin 102 is configured to couple the end 92 of the elongate element 60 to the cam component 100 mounted to each mating element 90. Although a single hinge pin 102 is shown, embodiments where two distinct hinge pins are each configured to couple a portion of the elongate element, such as an arm 94, 96 formed at the end 92 for example, to a respective mating element 90 and cam component 100 are also contemplated herein. Although two separate cam components 100 are shown, embodiments having any number of cam components 100 and also embodiments where the cam components 100 are coupled together, such as via a connector as shown in FIG. 12 for example, are also contemplated herein.

As previously noted, each cam component 100 is configured to rotate about a central axis X defined at the end of the structure 72 by the mating elements 90. The axis X is arranged within a plane oriented generally perpendicular to the length of the structure 72 extending between the first end 82 and the second ends 86, 88. The hinge pin 102 is mounted to each cam component 100 at a position offset laterally and/or radially from the central axis X. As a result, rotation of the cam components 100 about the central axis X will move the end 92 of the elongate element 60 eccentrically relative to the first end 82 of the structure 72. Accordingly, by rotating the cam components 100 about the central axis X, the distance or length extending between the first end 82 of the structure 72 and the end 92 of the elongate element 60 is adjustable. Because the first end 82 of the structure 72 is coupled to the rotating swashplate 54 and the distal end of the elongate element 60 is affixed to the mixer housing 56, the change in length resulting from rotation of the cam components 100 further causes the nominal effective length of the adjustable scissor control link 70 to vary, permitting blade 20 pitch adjustments for purpose of rotor track and balance.

Figure 9:
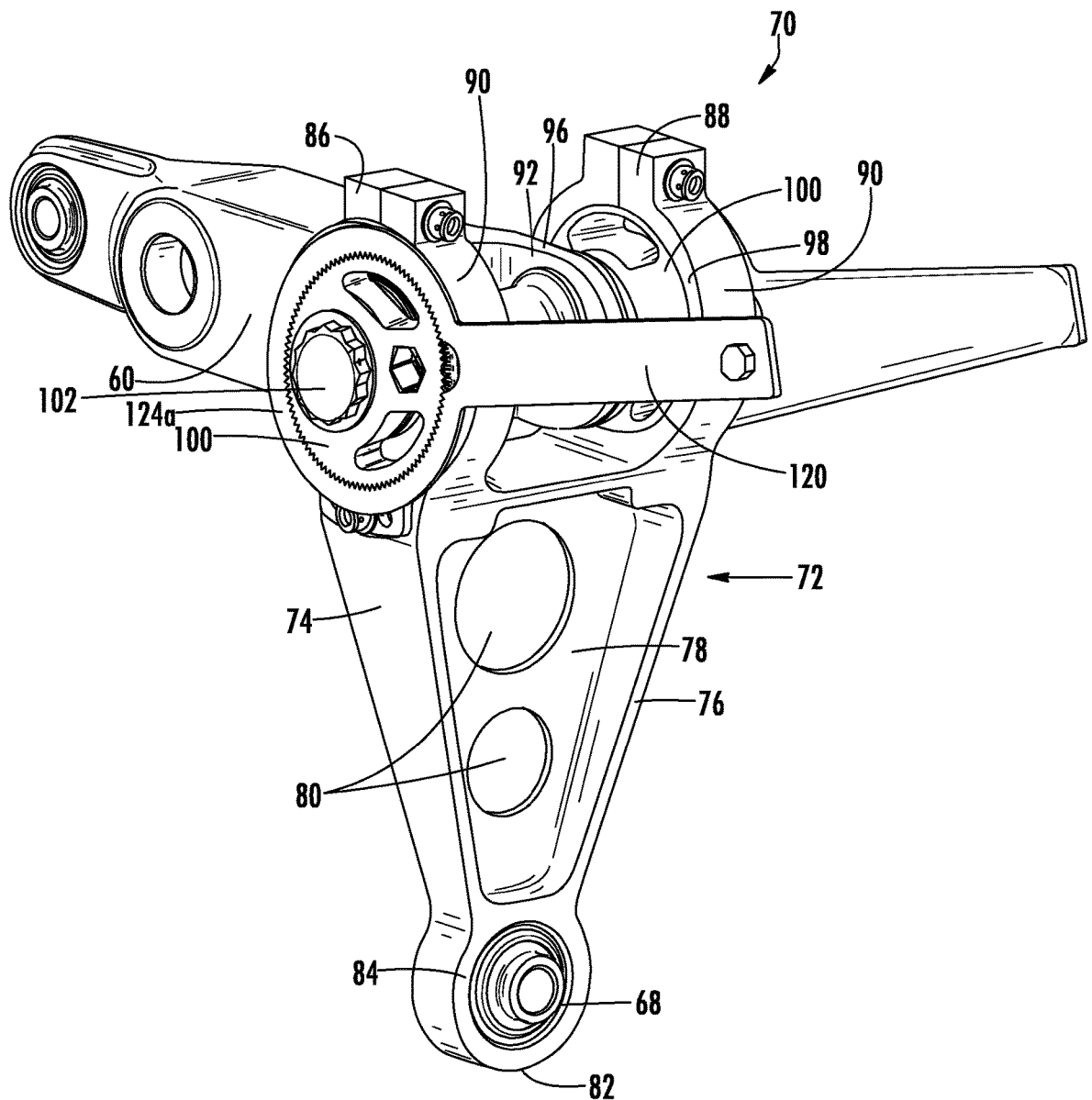
FIG. 9 is a perspective view of an adjustable scissor control link having a tool attached thereto in accordance with an embodiment.
Figure 10:
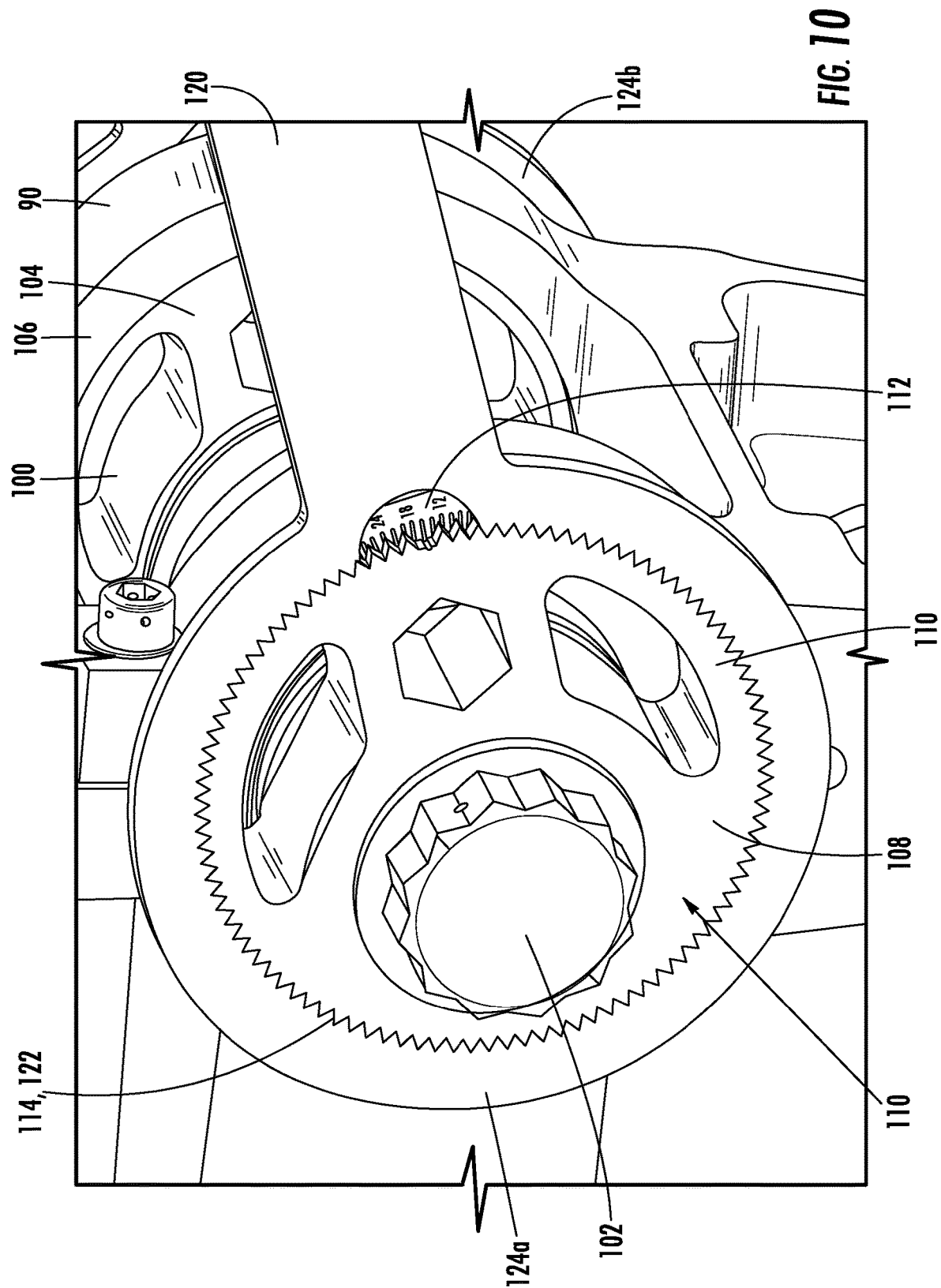
FIG. 10 is a detailed perspective view of FIG. 9 in accordance with an embodiment.

With reference now to FIGS. 7-10, in the illustrated, non-limiting embodiment, the cam components 100 are substantially identical and include a first end 104 that is arranged generally flush or with an overlapping flange with an inner surface 106 of an adjacent mating element 90. The second opposite ends 108 of the cam components 100 may include a protrusion or a flange 110 disposed in overlapping arrangement with the outer surface 112 of a respective mating element 90. As shown, one or more primary engagement features 114, such as teeth for example, may be formed about a periphery or outer circumference of the protrusion or a flange 110. As best shown in FIGS. 9 and 10, a tool 120 may be used to rotate the cam component 100 about the central axis X to adjust the length of the structure 72 of the scissor control rod 70. In such embodiments, the tool 120 may include one or more secondary engagement features 122 complementary to and configured to cooperate with the at least one primary engagement feature 114 formed on the cam components 100.

Figure 11:
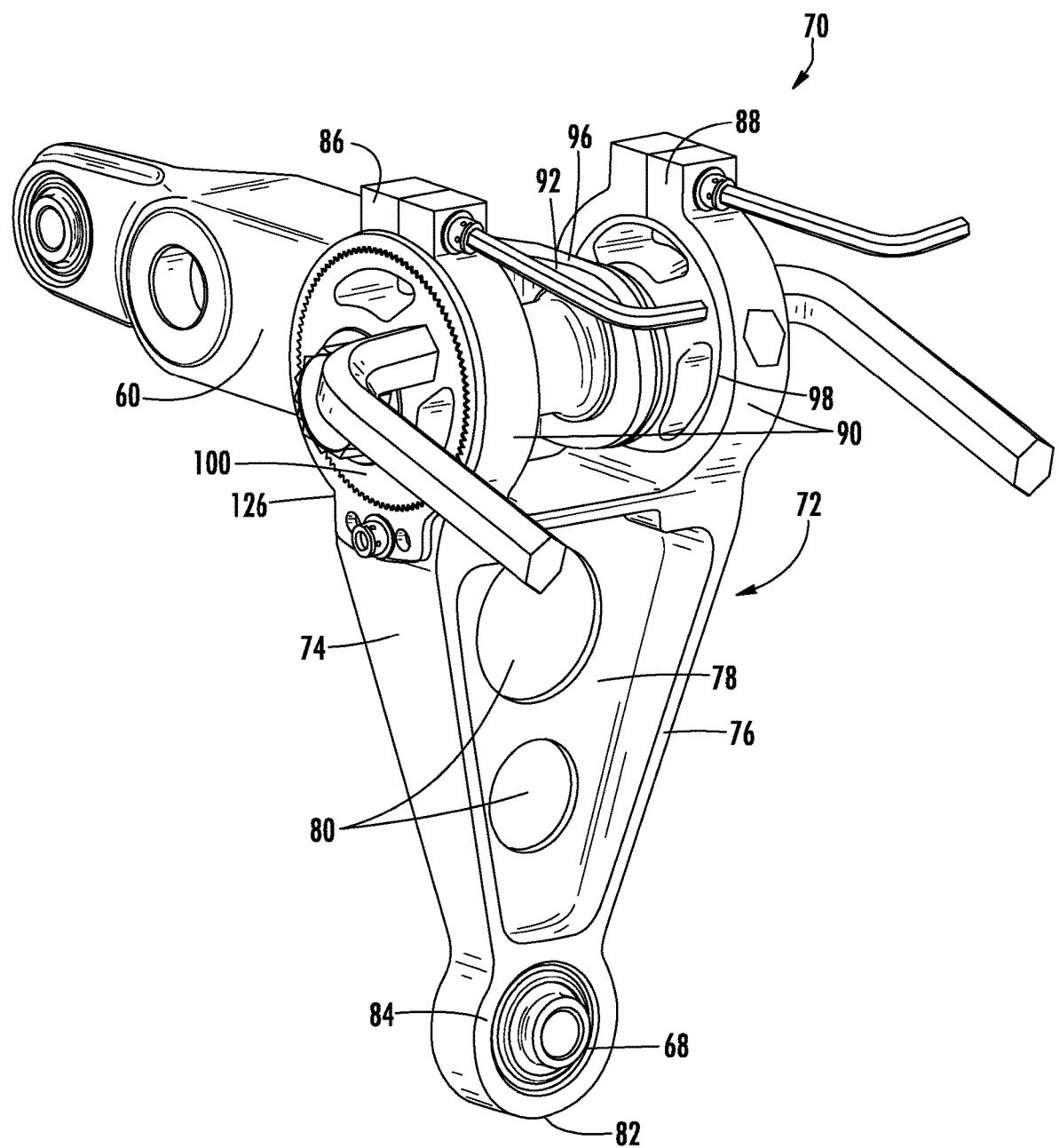
FIG. 11 is perspective view of an adjustable scissor control link having a simple tool attached thereto in accordance with an embodiment.

In the illustrated non-limiting embodiment, the tool 120 includes a first head 124a and a second head 124b, each of which is configured to cooperate with a respective cam component 100. In such embodiments, the cam components 100 are rotated substantially simultaneously about the central axis X. However, embodiments where the cam components 100 are rotated individually by a single tool or multiple tools 120 are also within the scope of the disclosure. Once a desired position of the cam component 100 has been achieved, the friction clamp of the mating element 90 is tightened. A locking mechanism 126, such as a splined locking ring for example, may be installed about the cam component 100 to provide redundancy to the friction clamp. In an alternative embodiment, best shown in FIG. 11, the cam components 100 and/or the fasteners associated with the mating elements may include features suitable for use with existing, simple tools. For example, in the illustrated, non-limiting embodiment, the cam components 100, the fasteners of the mating elements 90, and the fastener for the locking mechanism 126 include hexagonal holes or features for adjustment using a corresponding hexagonal key or Allen wrench.

In an embodiment, one or more markings 130 provide a reference relative to the position of the cam component 100 about the central axis X. In the illustrated, non-limiting embodiment, the markings 130 are formed in the outer surface 112 of at least one mating piece; however, markings arranged at any suitable located are within the scope of the disclosure. An indicator 132 is formed in the adjacent cam component 100. As shown, the indicator 132 may be a notch where one or more sequential engagement features 114 formed about the periphery of the cam component 100 are missing. The indicator 132 may be used to provide visual confirmation to a user or mechanic of the current configuration of the scissor control link. Rotation of the cam component 100 in a first direction relative to a neutral position will indicate a nose-down blade pitch, and similarly rotation of the cam components 100 in a second, opposite direction will indicate a nose-up blade pitch. The markings 130 on the scissor control link 70 may be any suitable scale or unit. In an embodiment, the units used are intended to eliminate the need to perform a conversion when making adjustments.

The scissor control link 70 as illustrated and described herein allows for easy adjustment that provides a user with visual confirmation of the status. As a result, the likelihood of incorrect adjustment is reduced. Further, because the scissor control link 70 does not include any threaded engagements that may fatigue with time, the scissor control link 70 is potentially more robust than existing designs. In addition, the scissor control link 70 may be retrofitted into existing rotor systems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An adjustable control link for transferring rotor shaft rotation to a rotating swashplate, the control link comprising:
   an elongate element rotatable with the rotor shaft, the elongate element having a first end;
   a structure having an opening and a second end;
   at least one cam component disposed within the opening and rotatable relative to the structure about a central axis of the opening;

a pin configured to couple the elongate element to the at least one cam component, wherein the pin is eccentrically rotatable about the central axis to move the first end of the elongate element relative to the second end of the structure, wherein the rotation of the cam component is configured to move the elongate element eccentrically relative to the structure.

2. The adjustable control link of claim 1, wherein the pin is mounted to the at least one cam component at a position offset from the central axis.

3. The adjustable control link of claim 2, wherein the pin is radially offset from the central axis.

4. The adjustable control link of claim 2, wherein the pin is laterally offset from the central axis.

5. The adjustable control link of claim 1, wherein the structure further comprises:
 a first sidewall;
 a second sidewall; and
 a body extending between the first sidewall and the second sidewall;
 wherein the opening is disposed in the first and second sidewalls and the pin extends between the first and second sidewalls so as to dispose the elongate element therebetween.

6. The adjustable control link of claim 5, wherein the first sidewall and the second sidewall converge at the second end of the structure.

7. The adjustable control link of claim 5, wherein a mating element is defined at an end of at least one of the first sidewall and the second sidewall, the at least one cam component being mounted to the mating element.

8. The adjustable control link of claim 1, wherein the at least one cam component includes a flange and at least one primary engagement feature is formed at a periphery of the flange.

9. The adjustable control link of claim 8, wherein further comprising a locking mechanism selectively mounted to the at least one cam component to restrict rotation of the at least one cam component about the central axis.

10. The adjustable control link of claim 1, wherein the structure includes at least one marking and the at least one cam component includes an indicator movable into alignment with the at least one marking to indicate an angle of the elongate member relative to the structure.

11. A rotor control system for use with a rotor and an airframe comprising:
 a rotor shaft rotatable about a rotor axis;
 a rotating swashplate;
 at least one primary pitch control link associated with the rotor shaft;
 at least one secondary pitch control link coupled to rotating swashplate to control a position of the at least one primary pitch control link, wherein the at least one secondary pitch control link includes a scissor control link adjustable to control a length of the secondary pitch control link;
 wherein the scissor control link further comprises:
  at least one elongate element coupled to the at least one primary pitch control link, the elongate element having a first end;
  a structure having an opening and a second end;
  at least one cam component disposed within the opening and rotatable relative to the structure about a central axis of the opening; and
  a pin configured to couple the elongate element to the at least one cam component, wherein the pin is eccentrically rotatable about the central axis to move the first end of the elongate element relative to the second end of the structure, and wherein the rotation of the cam component is configured to move the elongate element eccentrically relative to the structure.

12. The rotor control system of claim 11, wherein the scissor control link transmits rotation of the rotor shaft to the rotating swashplate.

13. The rotor control system of claim 11, wherein the scissor control link is adjustable to control an angle between the at least one secondary pitch control link and the at least one elongate element.

14. The rotor control system of claim 13, wherein the pin is mounted to the at least one cam component at a position offset from the central axis.

15. The rotor control system of claim 13, wherein the structure further comprises:
 a first sidewall;
 a second sidewall; and
 a body extending between the first sidewall and the second sidewall.

16. The rotor control system of claim 15, wherein the first sidewall and the second sidewall converge at a first end of the structure.

17. The rotor control system of claim 15, wherein a mating element is defined at an end of at least one of the first sidewall and the second sidewall, the at least one cam component being mounted to the mating element.

18. An aircraft comprising a rotor, an airframe and the rotor control system of claim 11, wherein the rotor control system is configured for use with the rotor and the airframe.

19. The aircraft of claim 18, further comprising a second rotor coaxial with the rotor, wherein the rotor and the second rotor rotate in opposite directions about the rotor axis.

* * * * *